Oct. 13, 1925.
C. P. JACOBSEN
1,557,293
EYE SHADING ATTACHMENT FOR WINDSHIELDS
Filed April 17, 1924    2 Sheets-Sheet 1
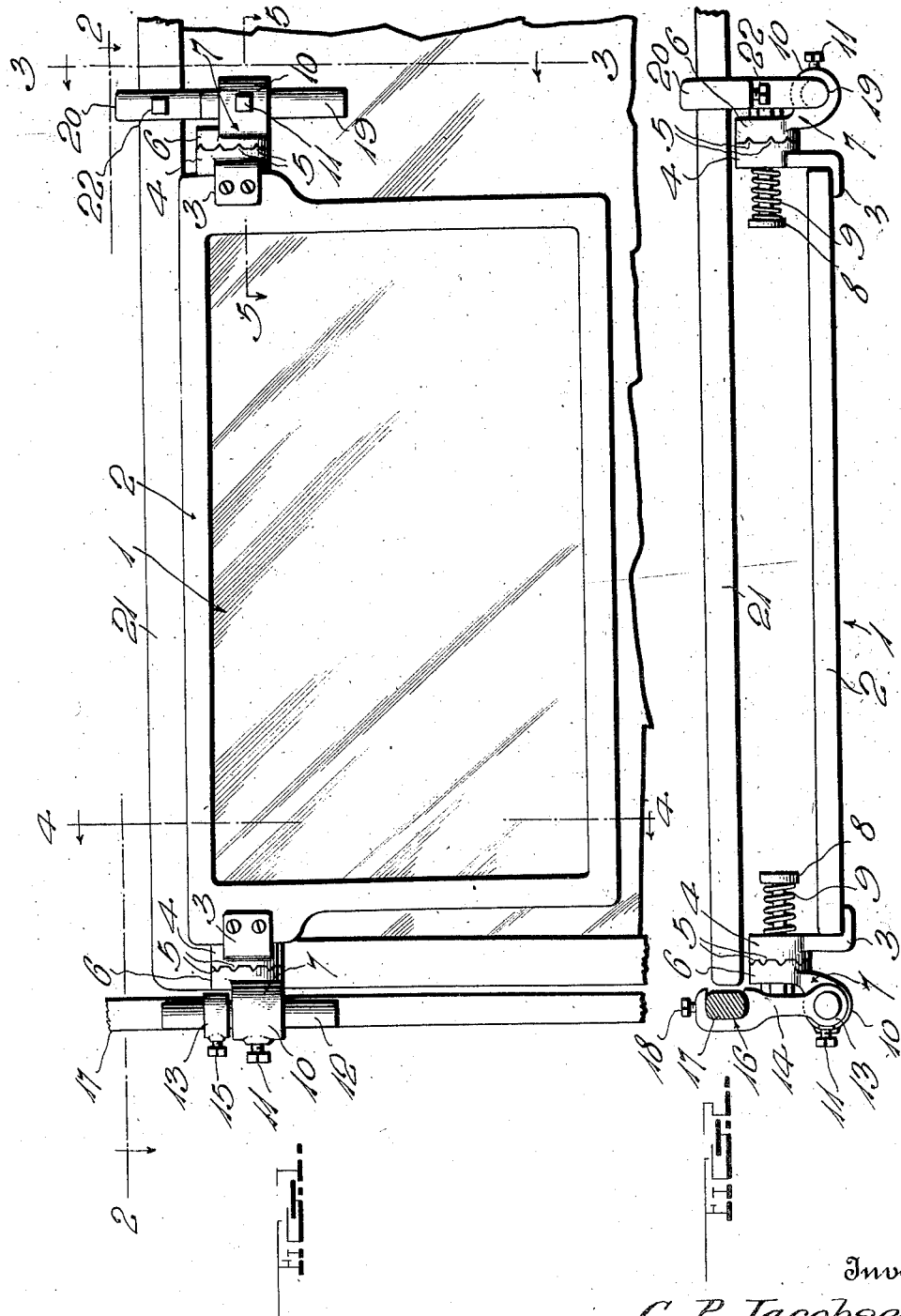
Witness
H. Woodard
Inventor
C. P. Jacobsen
By H. B. Wilson & Co.
Attorneys

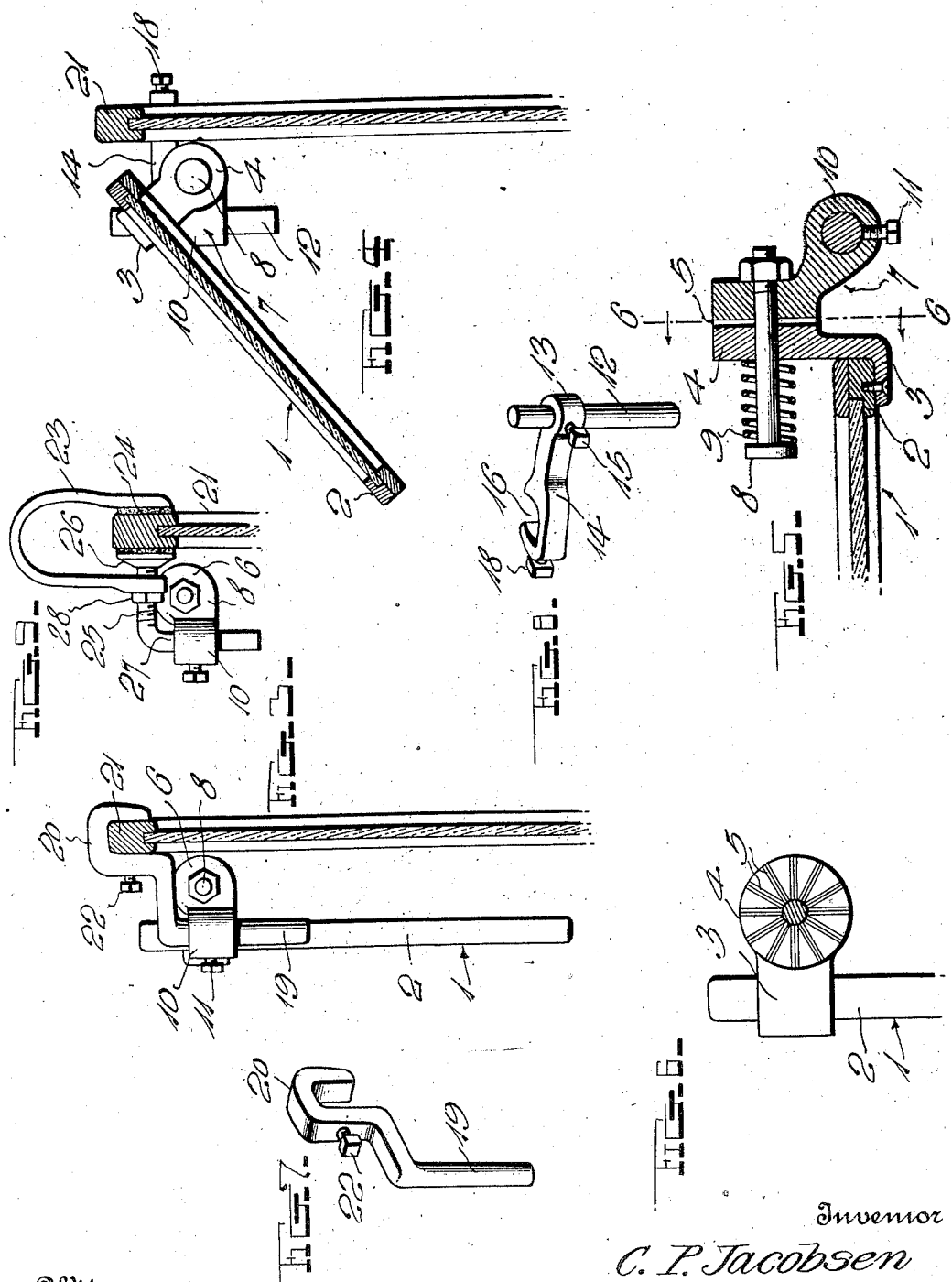

Patented Oct. 13, 1925.

1,557,293

UNITED STATES PATENT OFFICE.

CALLE P. JACOBSEN, OF OAKLAND, CALIFORNIA.

EYE-SHADING ATTACHMENT FOR WINDSHIELDS.

Application filed April 17, 1924. Serial No. 707,201.

*To all whom it may concern:*

Be it known that I, CALLE P. JACOBSEN, a citizen of the United States, residing at Oakland, in the county of Alameda and State of California, have invented certain new and useful Improvements in Eye-Shading Attachments for Windshields; and I do declare the following to be a full, clear, and exact description of the invention, such as will enable others skilled in the art to which it appertains to make and use the same.

My invention relates to improvements in devices intended to prevent blinding of automobile drivers by the headlights of approaching vehicles, and the device has reference more particularly to panels adapted to cover portions of automobile windshields, said panels being of such nature that the projected rays of headlights will be diffused and mellowed, so that no blinding effect will occur.

It is the object of the invention to provide a simple and inexpensive device of the class set forth provided with novel attaching means for engagement with frame parts of a windshield, permitting vertical adjustment of the eye shade to any desired extent and also permitting it to be swung upwardly out of the way when use is not necessary.

With the foregoing in view, the invention resides in the novel subject matter hereinafter described and claimed, the description being supplemented by the accompanying drawings.

Figure 1 is an elevation of the invention attached to a windshield.

Figure 2 is a horizontal sectional view as indicated by line 2—2 of Fig. 1.

Figure 3 is a vertical sectional view as indicated by line 3—3 of Fig. 1.

Figure 4 is a vertical sectional view as indicated by line 4—4 of Fig. 1, showing the shield swung partially upwardly.

Figure 5 is a detail horizontal sectional view as indicated by line 5—5 of Fig. 1.

Figure 6 is a vertical sectional view on line 6—6 of Fig. 5.

Figures 7 and 8 are detail perspective views.

Figure 9 is a view similar to Fig. 3 but illustrating a different form of construction.

In the drawings above briefly described. the numeral 1 designates an eye shield adapted to cover the portion of a windshield in front of the driver, said eye shield being of any desired form to prevent blinding by the rays from the headlights of approaching vehicles. For instance, a colored glass plate may be used and I have indicated such plate held within an appropriate frame 2. Lugs 3 are shown secured to the inner and outer ends of the frame 2, said lugs having circular front ends 4 which are provided preferably with teeth 5. The outer sides of the lug ends 4 contact with the circular front ends 6 of bracket members 7 to which they are pivoted by bolts or the like 8. In the construction shown, the bracket ends 6 are formed with grooves to receive the teeth 5 and coiled springs 9 are mounted on the bolts 8 to engage said teeth and grooves, so as to hold the shield 1 in any position to which it is adjusted. Each of the brackets 7 is provided with a vertical guide 10, having a set-screw 11.

Received in the guide 10 at the outer end of the eye shield 1, I have shown a vertical post 12 which passes through a guide 13 on the rear end of a substantially horizontal attaching arm 14, the two guides 10 and 13, associated with said post, being secured to the latter by the set screw 11 of the guide 10 and another set screw 15 with which the guide 13 is provided. Near its front end, the inner side of the attaching arm 14 is formed with a notch 16 to receive a vertical frame part 17 of a windshield, and a set screw 18 is carried by said attaching arm to engage said frame part and secure said arm thereto.

The guide 10 at the inner end of the eye-shield 1 receives a vertical post 19 having a hook-like portion 20 at its upper end constituting an attaching member which is adapted to hook over a horizontal windshield part 21, to which it may be secured by a set-screw 22.

In Fig. 9, I have illustrated a clamp having an arched body member 23 to pass over the upper side of the windshield frame. I have shown one arm of this body member provided with a pad 24 while a set-screw 25 is threaded through the other arm thereof to actuate a padded clamping member 26 secured to the inner end of the screw, whereby tightening of the screw 25 will tightly hold the device upon the windshield. The outer end of the screw 25 is bent laterally at right angles to provide an operating handle or post 27 which is disposed vertically when the screw is tightened, said screw is preferably locked by a nut 28. By using two of the clamps 23, it will be seen that the posts 27 of the screws 25 may be received in the eyes 10 of the bracket members 7, forming a more simple way of attaching the eyeshield to a windshield.

By employing the construction shown and described, loosening of the set-screws 11 will permit vertical adjustment of the entire eye shade upon the posts 12 and 19, or if desired the set-screw 15 may be loosened at the outer end of the eye-shield instead of loosening the screw 11 at such end. Thus, the eye-shield may be set at the most advantageous point and when secured at such point, it may be swung upwardly or downwardly at will, and the co-acting teeth and grooves on the parts 4 and 6, will hold it in any position at which it is set.

The construction shown and described, is simple and inexpensive, may be quickly and easily attached to a windshield, and is very desirable in general. Hence, it may be considered as the preferred form of construction, but within the scope of the invention as claimed, numerous minor changes may be made.

I claim:

1. A device of the class described comprising a pair of screw clamps arranged in horizontally spaced relation and adapted to clamp onto frame parts of a windshield, an upright post carried by each clamp, the two posts being arranged in spaced parallel relation and being offset laterally away from the inner sides of said clamps, brackets mounted on said posts for adjustment to different longitudinal positions along the same, said brackets extending inwardly toward said clamps, an anti-glare shield provided at its ends with inwardly extending lugs disposed adjacent the inner sides of said brackets, and pivots securing said lugs to said brackets.

2. A device of the class described comprising a clamp composed of a U-shaped body member and a clamping screw threaded through one side of said body member and having its inner end in opposing relation to the other side of the latter, the outer end of said screw being bent at right angles to provide a post, a bracket mounted upon said post for adjustment to different longitudinal positions along the same, and an anti-glare shield pivoted to said bracket.

In testimony whereof I have hereunto set my hand.

CALLE P. JACOBSEN.